Jan. 7, 1930.  P. E. KEILEY  1,743,038
PORTABLE ELEVATING BIN
Filed Dec. 17, 1928   6 Sheets-Sheet 2
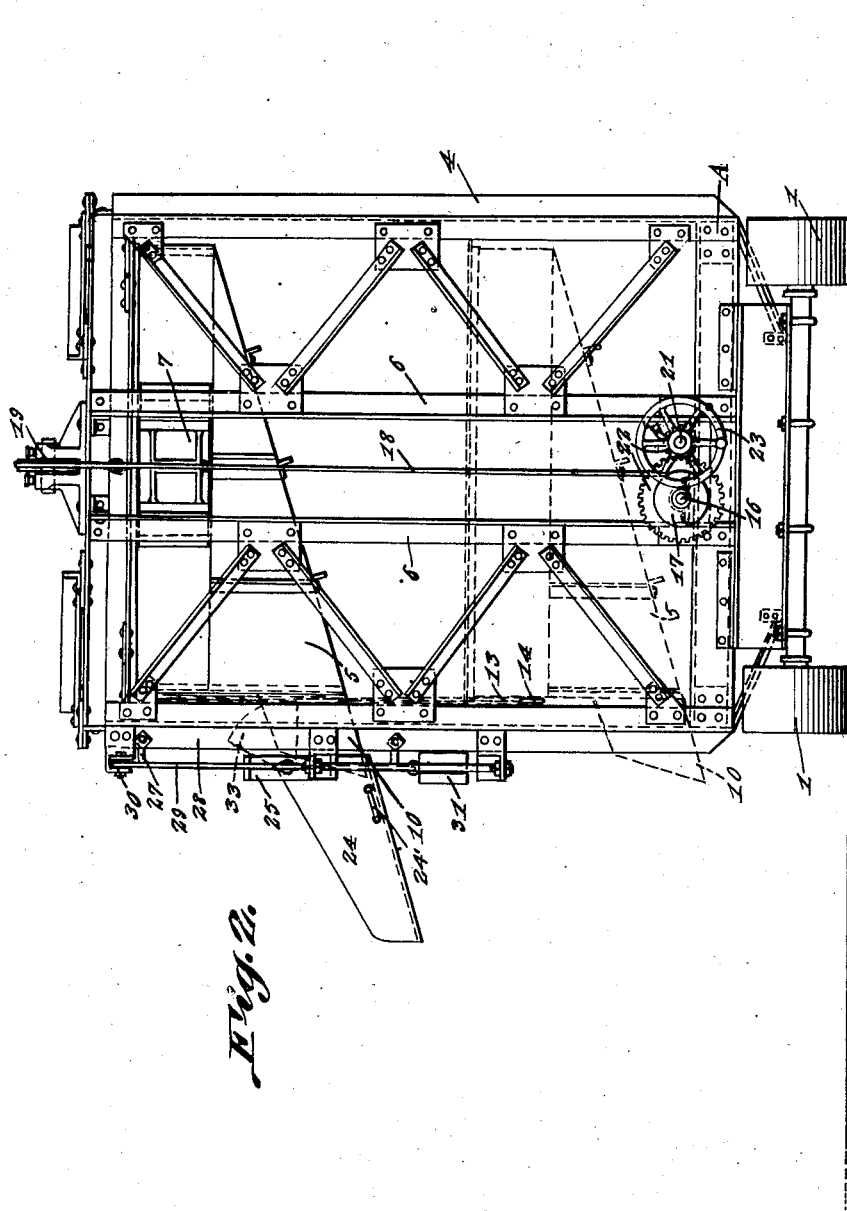
P. E. Keiley, INVENTOR
BY Victor J. Evans
ATTORNEY

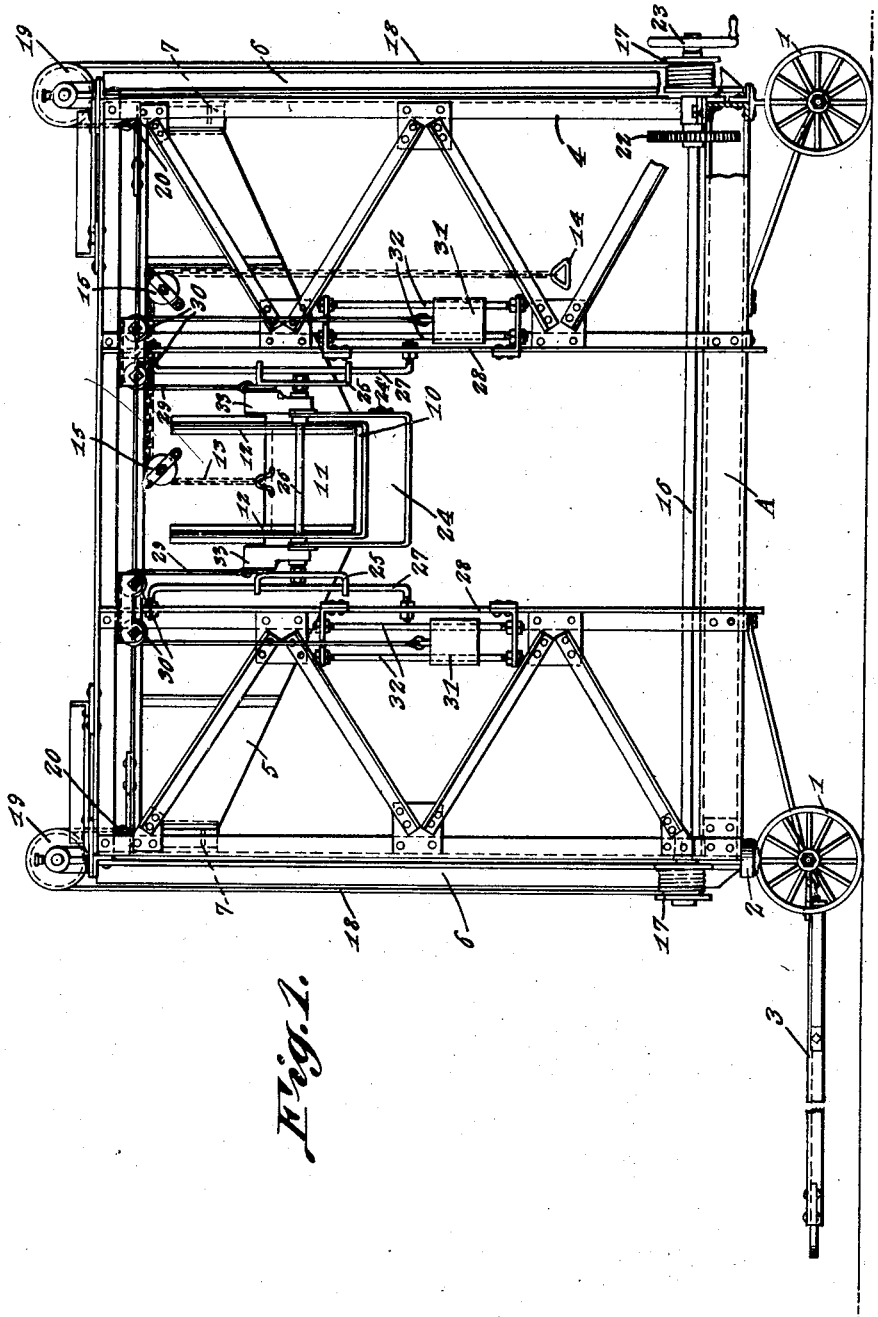

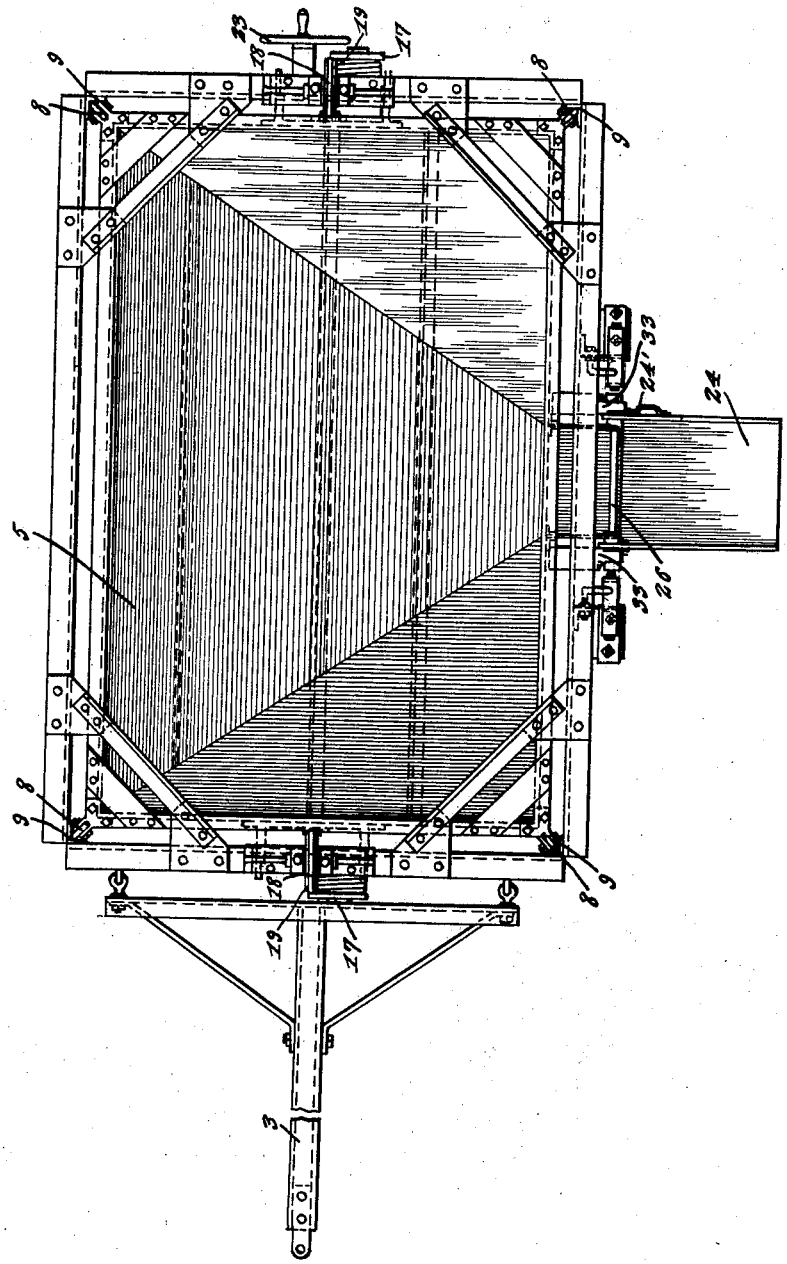

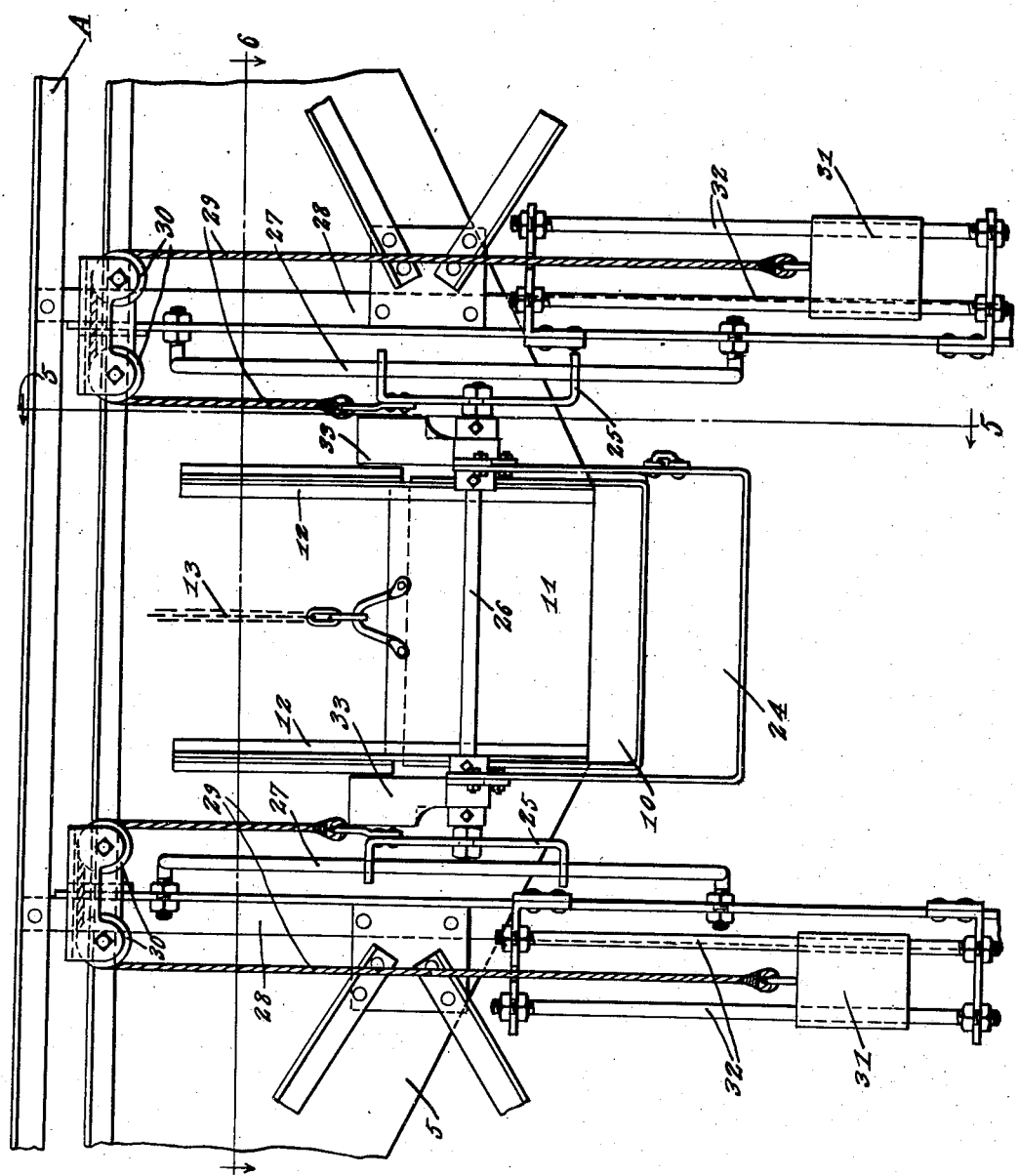

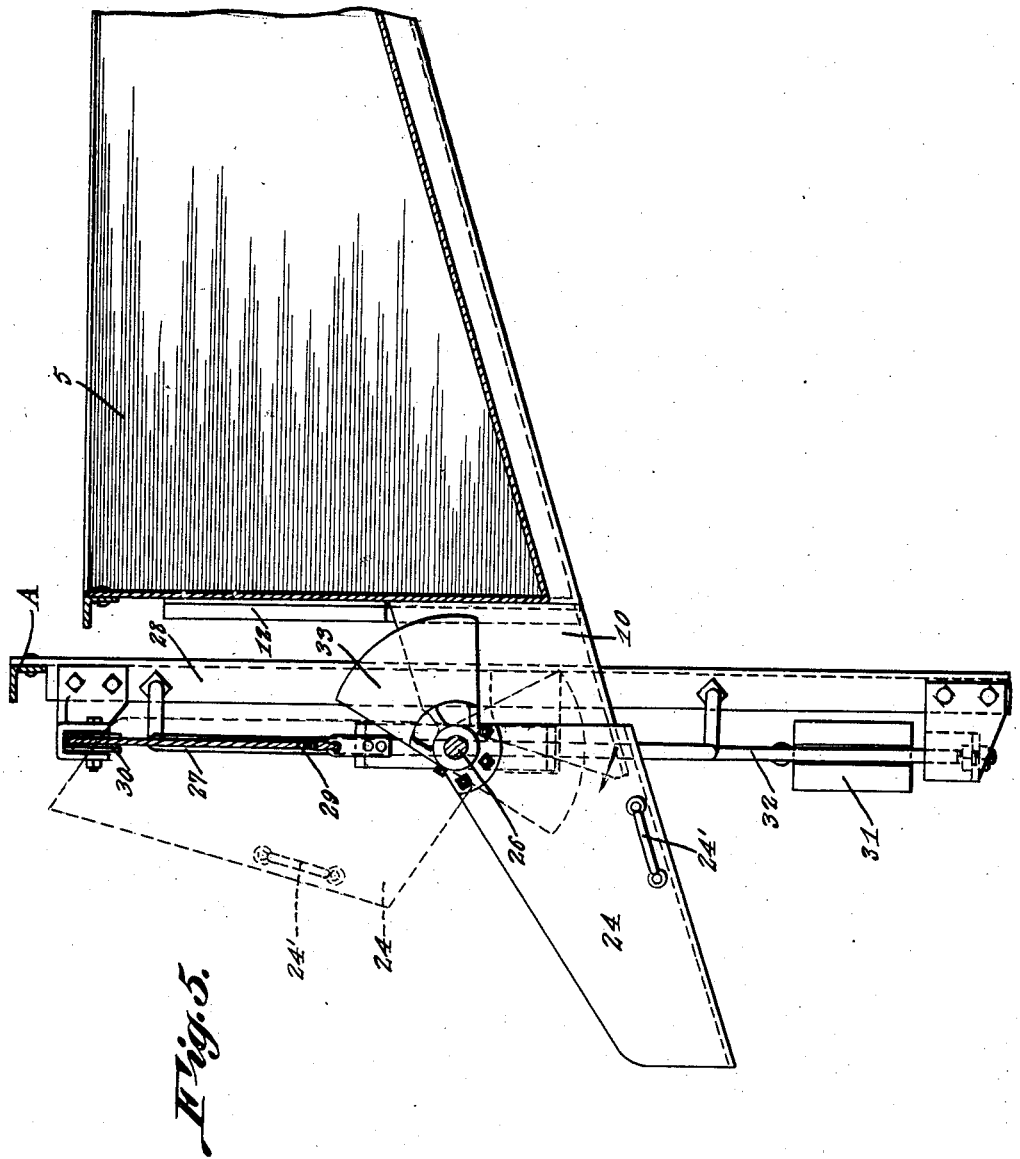

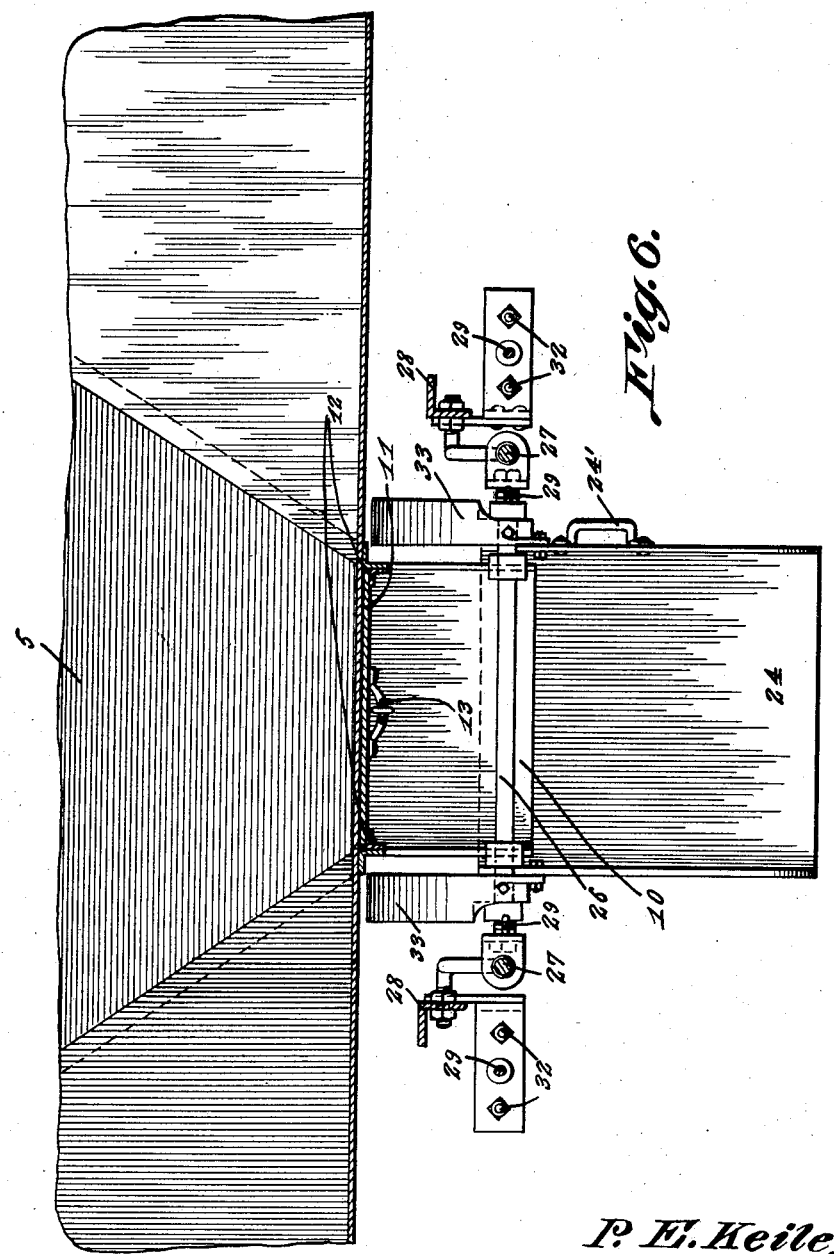

Patented Jan. 7, 1930

1,743,038

UNITED STATES PATENT OFFICE

PATRICK EDWARD KEILEY, OF ATLANTA, GEORGIA

PORTABLE ELEVATING BIN

Application filed December 17, 1928. Serial No. 326,676.

This invention relates to a portable elevating bin, the general object of the invention being to provide means for facilitating the loading of trucks and wagons with coal, sand, gravel, crushed stone, etc., by providing a truck having a frame thereon which supports a vertically movable bin raised and lowered by hand, with an adjustable chute whereby the bin can be lowered for filling purposes and then raised to the desired height and the chute adjusted so that quantities of the material in the bin can be loaded into a truck or wagon drawn up alongside the device.

Another object of the invention is to provide a sliding door for controlling the outlet of the bin and counterweights for facilitating the manual movement of the adjustable chute.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a side view of the apparatus.
Figure 2 is a rear end view thereof.
Figure 3 is a plan view.
Figure 4 is an enlarged elevation of the adjustable chute and the parts associated therewith.
Figure 5 is a section on line 5—5 of Figure 4.
Figure 6 is a section on line 6—6 of Figure 4.

In these views, A indicates a truck which is provided with the wide wheels 1 and which has ball bearings 2 associated with its fifth wheel, the truck being provided with a tongue 3 so that it can be pulled by horses or a tractor. A frame 4 is attached to the body of the truck, this frame being of openwork construction and a bin 5 is supported for vertical movement in said frame. A pair of guide bars 6 is arranged at each end of the frame and a casting 7 is arranged at each end of the bin and has parts engaging the bars 6 for guiding the bin during its movement and the bin is also guided by the rolls 8 arranged at the corners thereof and engaging the angle guiding bars 9 arranged at the corners of the frame. The bin is formed with a bottom part which slopes to the discharge chute 10 at one side of the bin so that the bin will automatically empty itself through the discharge opening when the sliding door 11 is opened. This door is slidably arranged in the guideways 12 on one side of the bin and a cable 13 has one end connected with the door and has a handle 14 at its other end, the cable passing over the guiding pulleys 15 arranged adjacent the top of the bin.

A shaft 16 is journaled in the lower part of the frame adjacent the longitudinal center thereof and a drum 17 is fastened to each end of the shaft. A cable 18 is wound on each drum and passes over a pulley 19 at the top of the frame, the other end of each cable being fastened to an end of the bin, as shown at 20. A stub shaft 21 is journaled in the lower part of the frame at one end thereof and gears 22 connect the two shafts together. A hand wheel 23 is fastened to the outer end of the stub shaft so that by turning this wheel, rotary movement will be imparted to the shaft 16 from the shaft 21 and thus the bin will be moved vertically through the drums and cables.

A chute 24 is pivotally connected with the slides 25 through means of the shaft 26 and these slides 25 are vertically movable on the guide rods 27, each of which is connected to a vertically arranged bar 28 fastened to a part of the frame. A cable 29 has one end fastened to each slide 25 and said cable passes over the guiding pulleys 30 supported at the upper part of the frame and the other end of each cable is connected to a weight 31 which is vertically movable between the guide rods 32 supported in a part of the frame, these weights acting as counterbalances for the chute and its associated parts. Counterbalanced weights 33 are carried by the shaft 26 for counterbalancing the chute in its pivotal movement.

From the foregoing it will be seen that I have provided a portable bin which can be easily moved from one point to another by a tractor or the like, with manually operated means for raising and lowering the bin so that it can be loaded when in lowered position and then raised to the desired position so that material in the bin can pass into wagons or trucks drawn up alongside the device. It will, of course, be understood that the chute 24 is swung upwardly into the dotted line position shown in Figure 5 before the bin is lowered and then, after the bin has been loaded and raised, the slides and the chute are moved downwardly and then the chute is swung outwardly into the solid line position shown in Figure 5 so that it will receive the material passing from the bin chute 10 when the door is raised. A handle 24' is placed on one side of the chute 24 to facilitate movement thereof.

This invention will greatly reduce the time required in loading trucks and wagons with coal, sand, etc., and the device is very simple to operate and its maintenance cost is low.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. A device of the class described comprising a truck, a frame supported thereon, a bin vertically movable in the frame and having a discharge opening in its lower part, a sliding door for closing the opening, a chute attached to the bin for receiving the material passing through the opening, a second chute, a pair of slides to which the second chute is pivotally connected, counterweights connected with the slides, said second chute receiving the material from the first chute when said second chute is in operative position and manually operated means for raising and lowering the bin.

2. A device of the class described comprising a truck, a frame supported thereby, a bin vertically movable in the frame, guiding means between the bin and frame, manually operated means for raising and lowering the bin, said bin having a discharge opening in its lower part, a chute attached to the bin for receiving the material passing through the opening, a sliding door on the bin for closing the opening, means for operating the door, a pair of slides carried by the frame, a chute pivotally connected with the slides whereby the chute can be raised into inoperative position and lowered into operative position, counterweights for the second chute, counterweights slidably mounted in the frame, cables connecting the last mentioned weights with the slides and guiding pulleys for the cables.

In testimony whereof I affix my signature.

PATRICK EDWARD KEILEY.